Jan. 18, 1927.
C. G. KOPPITZ
1,614,889
HIGH TENSION CONSTRUCTION WORK
Filed Jan. 13, 1926
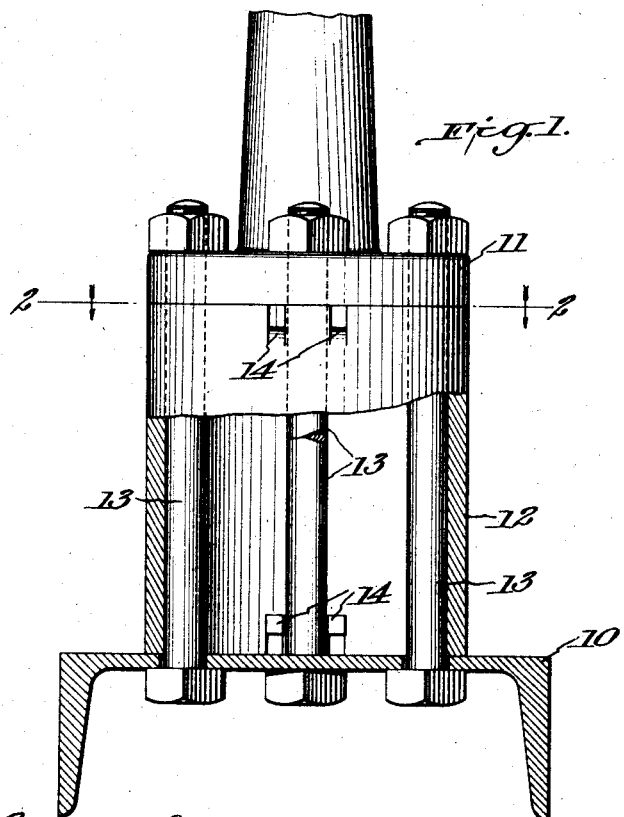
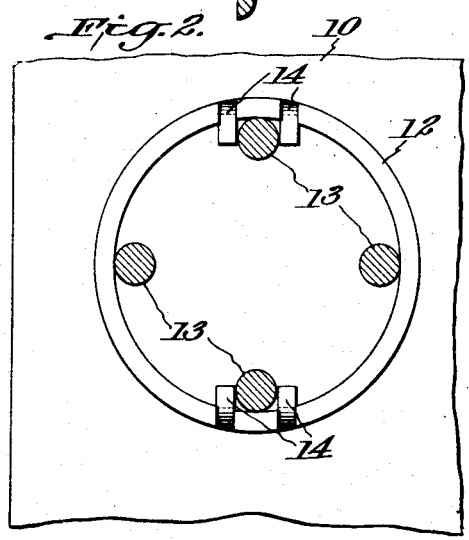
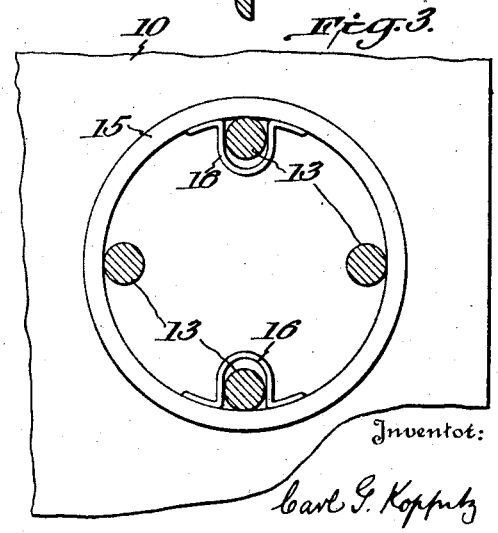
Inventor:
Carl G. Koppitz
By Byrnes, Townsend & Brickenstein
Attorneys.

Patented Jan. 18, 1927.

1,614,889

UNITED STATES PATENT OFFICE.

CARL G. KOPPITZ, OF GREENSBURG, PENNSYLVANIA, ASSIGNOR TO RAILWAY AND INDUSTRIAL ENGINEERING COMPANY, OF GREENSBURG, PENNSYLVANIA, A CORPORATION OF PENNSYLVANIA.

HIGH-TENSION CONSTRUCTION WORK.

Application filed January 13, 1926. Serial No. 81,118.

This invention relates to an improvement in connection with the construction of high-tension lines and more particularly to the mounting of insulators upon their supports.

It is general practice to interpose tubular spacers between the bases of the pins of the insulators and the supports, the bolts extending through the interior of the spacers. It is a common occurrence that the bolts thereby do not assume positions at right angle to the base and the support, but tilt, whereas they should be in lines representing the shortest distances.

To insure that the bolt holes in the base of the pin are in proper alignment with the bolt holes in the support requires good judgment and care for which, however, the average field men cannot be depended upon.

It is the object of this invention to provide spacers which insure proper positioning of the bolts in the assembly of insulators upon their supports.

For a full understanding of the invention, reference is made to the accompanying drawings, in which Fig. 1 is an elevation, partly in section, of a construction embodying the invention;

Fig. 2 is a section on line 2—2, Fig. 1; and

Fig. 3 is a section of a modified form of the invention.

Having reference to Figs. 1 and 2, 10 indicates an arm, usually a channel bar as indicated, for supporting insulators and 11 represents the base portion of an insulator pin. Between the base 11 and the arm 10 is disposed the tubular spacer 12 as it is usually applied. Bolts 13, usually four in number, extend through the spacer and the bolt holes of the arm 10 and the base 11 of the pin and are drawn up by nuts.

To this extent the arrangement corresponds to the usual practice.

In order to prevent skewing of the bolts and insure proper alignment, I provide the spacers with guides which establish parallelism of the bolts with the axis of the spacers.

As indicated in Figs. 1 and 2, such guides may be simply formed by shearing strips 14 from the metal of the spacer inwardly from the top and bottom edges and bending them inwardly to define passage ways for the bolts. In this manner angular shifting of the bolts may be fully prevented. When all four bolts are inserted through the bolt holes of both arm 10 and base 11 and also through the guide channels defined by the strips 14, they are bound to be in proper alignment.

It is not necessary that guides are provided for every bolt. In connection with a four bolt arrangement guides for diametrically opposite bolts are sufficient, provided the bolt holes and the spacer are so correlated that the bolts are substantially in contact with the walls of the spacer, as indicated, whereby a tilting of the bolts in the plane of the bolts is prevented aside from the skewing in peripheral direction.

In the form shown in Fig. 3, the spacer 15 is provided with straps or clips 16 attached to it in any suitable manner as, for instance, by spot welding.

There is considerable latitude as to the method of and means for providing guide elements for the purpose described. In practice, any construction that is simple and cheap to manufacture, may be employed.

It also should be understood that the disposition and the form of the guide elements may be varied within wide limits. In either of the forms disclosed, for instance, two of the guide elements may be disposed near the top edge and one or more near the bottom edge if they are angularly so related as to prevent tilting of the bolts. Thus the upper guide elements may be disposed in one radial plane, while one or two lower guide elements may be disposed in another radial plane or one upper and one lower guide element may be disposed in one radial plane, while another guide element either at the top or at the bottom may be disposed in a different radial plane.

While I preferably use guide elements straddling the bolts or entirely encompassing them, as shown, the proper alignment of the bolts may be attained by guide elements disposed only on one side of the bolts. The important point is that the guide elements cooperate to prescribe a definite position of the bolts relatively to each other and to the base of the insulator and the support respectively.

I claim:

1. A tubular spacer of the type used in high-tension construction work for spacing insulators from their supports, and guide elements on the inner wall of the spacer disposed to cooperate with bolts extending through bolt holes in a support and an insulator and the spacer to hold the bolts substantially in parallelism with each other and the axis of the spacer.

2. The combination with an insulator having a base, a support, the base and the support having a plurality of similarly spaced bolt holes, a tubular element for spacing the insulator from the support and bolts for interconnecting the insulator and the support through the spacer, of means on the inner wall of the spacer disposed to prescribe positions for the bolts in parallelism with each other and the axis of the spacer.

In testimony whereof, I affix my signature.

CARL G. KOPPITZ.